(12) United States Patent
Briles et al.

(10) Patent No.: US 6,524,380 B1
(45) Date of Patent: Feb. 25, 2003

(54) MAGNESIUM METHYLATE COATINGS FOR ELECTROMECHANICAL HARDWARE

(75) Inventors: Owen M. Briles, Rockford, IL (US); Dave Okey, Rockford, IL (US)

(73) Assignee: Hamilton Sundstrand Corporation, Rockford, IL (US)

(*) Notice: Subject to any disclaimer, the term of this patent is extended or adjusted under 35 U.S.C. 154(b) by 0 days.

(21) Appl. No.: 09/519,648

(22) Filed: Mar. 6, 2000

(51) Int. Cl.[7] ................................................. C09D 1/00
(52) U.S. Cl. .................................................. 106/287.26
(58) Field of Search ..................... 106/287.26

(56) References Cited

U.S. PATENT DOCUMENTS

| | | | |
|---|---|---|---|
| 2,796,364 A | 6/1957 | Suchoff | 117/222 |
| 3,318,731 A | 5/1967 | Blum | 117/215 |
| 3,591,729 A | 7/1971 | Camras | 179/100.2 |
| 3,848,331 A | 11/1974 | Pavlik et al. | 29/596 |
| 3,948,690 A | 4/1976 | Pavlik et al. | 148/31.55 |
| 4,158,561 A | 6/1979 | Pavlik et al. | 75/5 BA |
| 4,158,580 A | 6/1979 | Reynolds et al. | 148/104 |
| 4,158,582 A | 6/1979 | Krause | 148/120 |
| 4,322,481 A | 3/1982 | Krause | 428/611 |
| 4,482,476 A | 11/1984 | Yoshimura et al. | 252/511 |
| 4,621,416 A | 11/1986 | Krause et al. | 29/606 |
| 4,942,061 A | 7/1990 | Domes | 427/104 |
| 4,975,330 A | 12/1990 | Mosser | 428/472.1 |
| 5,091,253 A | 2/1992 | Smith et al. | 428/363 |

*Primary Examiner*—David Brunsman
(74) *Attorney, Agent, or Firm*—Stephen G. Mican

(57) ABSTRACT

A magnesium methylate coating useful for insulating electromechanical hardware that comprises a composition of magnesium methylate, methyl alcohol, silica and talc.

4 Claims, 2 Drawing Sheets

MAGNESIUM METHYLATE COATINGS FOR ELECTROMECHANICAL HARDWARE

TECHNICAL FIELD

The present invention relates to insulative coating compositions for insulating stacked laminations used in electromechanical hardware, such as rotors and stators in electrical motors and generators, and a method of making rotors and stators for use in electric motors and generators using these coatings.

BACKGROUND ART

Electrical components such as rotors and stators for motors and generators are typically manufactured from a plurality of thin steel laminations which are stacked together to form the rotor or stator. Treating each lamination with an insulative coating reduces the eddy current losses inherent in motors and generators. Some chemical compounds that have been commonly used for such insulative coatings include those made from aluminum chromate and containing hexavalent chromium. These are environmentally unsafe and hazardous to personnel involved in manufacturing the components. Accordingly, workplace exposure to hexavalent chromium is strictly limited by regulation and further regulations concerning air and water levels of chromium compounds have been issued or are expected to be issued.

Solutions of magnesium methylate in methanol are known to be effective in forming thin insulative coatings. See, for example, Suchoff, U.S. Pat. No. 2,796,364. Magnesium methylate is believed to be free of the health and safety risks associated with hexavalent chromium compounds. Applying a solution of magnesium methylate in an organic solvent to a metal surface and heating the surface to evaporate the solvent produces a thin coating of magnesium oxide on the surface of the metal. A thicker coating would result in improved electrical insulation between the laminations, and in a corresponding reduction in eddy current losses. There is a need for thicker, more effective magnesium methylate coatings, which would provide improved reduction in eddy current losses in motor and generator rotors and stators, compared to prior art coatings. There is also a need to avoid the health and safety risks associated with other coatings, such as hexavalent chromium compounds.

SUMMARY OF THE INVENTION

According to one aspect of the present invention, a coating composition includes magnesium methylate, methyl alcohol, silica and talc. The coating can also include a wetting agent, such as a nonionic, phosphate surfactant. The composition may include methyl alcohol, and magnesium methylate in a concentration up to ten percent by weight. The composition may also include silica in a concentration up to 15% by weight, and talc in a concentration up to 25% by weight. It is also advantageous to add a small amount of wetting agent, in order to ease the preparation of the coating, in an amount not exceeding 1% by weight.

DESCRIPTION OF THE INVENTION

Figure 1:
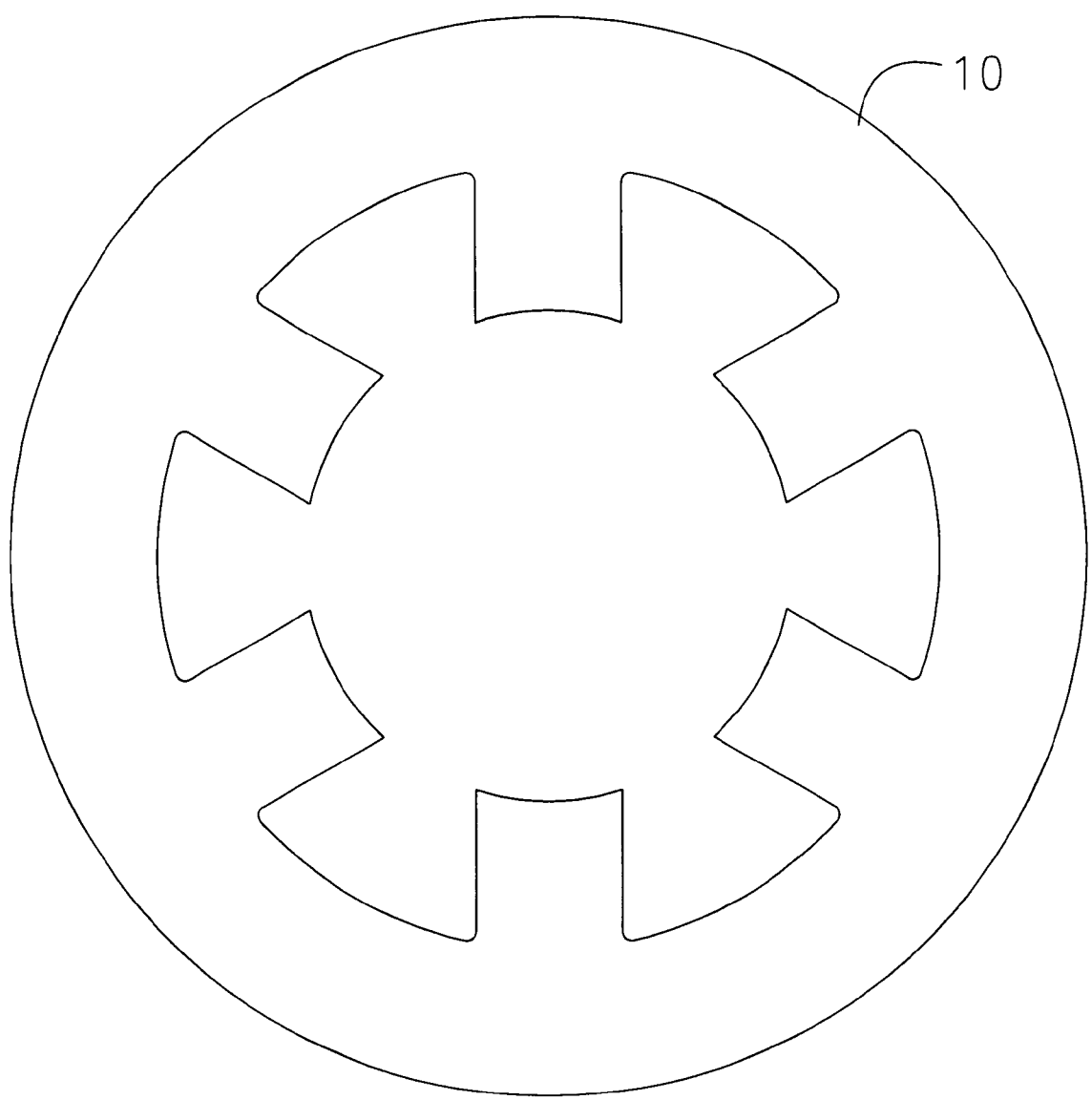
FIG. 1 is a depiction of a stator lamination of the present invention.

Samples were made of the several coatings used in this invention. Test strips of steel were coated with the coatings and tested for surface electrical resistance. The coatings used were several percentages of magnesium methylate in methyl alcohol and magnesium methylate in methyl alcohol with talc and silica. We also tested rings coated with magnesium hydroxide, steam oxide, and a chromate coating, such as the chromate coatings of the prior art. Magnesium hydroxide, milk of magnesia, readily forms a coating on samples. "Steam oxide" is a coating formed by reacting steel laminations with live steam inside an autoclave. Results of surface resistance testing are shown in Table 1, and of course the higher the resistance, the better the coating.

TABLE 1

| Coating | Bare steel | Chromate | $Mg(OH)_2$ | Steam Oxide | 2% Magnesium Methylate in MeOH | 4% | 8% | 5% Mag Methylate 3% silica, 6% talc |
|---|---|---|---|---|---|---|---|---|
| Surface Resistance | 0 ohms | 10–30 | 1000 | 925 | 350 | 540 | 880 | 1000 |

Testing done with .014" thick Hiperco 50 rings.

In addition, more samples were prepared using these coatings on Hiperco 50 steel. Rings were stamped for core loss tests and subsequently coated with the coatings mentioned. These rings are 1.5" o.d. and 1.25" i.d., and are stacked about ⅜" high, for a core loss test per ASTM A697. This test measured the AC core losses in a given stack. AC core loss depends on the steel used, the lamination thickness, and on the quality of surface insulation separating one lamination from the next. In core loss tests, unlike the surface resistance tests, the lower the loss, the better the material used. Results are shown in Table 2.

TABLE 2

Core Loss in Watts per lb. for 15 or 20 Kilogauss

| Coating | Chromate | 10% Mg Methylate in methyl alcohol | Magnesium Hydroxide | Steam Oxide | 5% Magnesium Methylate in MeOH, with 3% silica and 6% talc |
|---|---|---|---|---|---|
| AC15 | 20.9 | 21.2 | 21.6 | 21.2 | 21.1 |
| AC20 | 37.4 | 36.9 | 37.5 | 37.0 | 36.5 |

Testing done with .014" thick Hiperco 50 rings.

In one embodiment of the invention, the coating may be prepared in steps. A solution is prepared by dissolving magnesium methylate in methyl alcohol. This solution may be thickened by adding silica in a concentration of up to 15% by weight, or by adding talc in a concentration up to 25% by weight. The solution may be stirred to encourage uniformity, and a wetting agent may be added to aid in the dispersal. In one embodiment of our coating, the composition can include about 4 to 6% magnesium methylate by weight, about 2 to 4% silica by weight, and about 5% to 7% talc by weight, with zero to 1% by weight wetting agent, and the remainder methyl alcohol. In one embodiment of our invention, a final concentration of 6% talc, 5% magnesium methylate, and 3% silica, with 0.4% Victawet 12 surfactant, in a solution of methyl alcohol, was demonstrated to produce an effective coating. Victawet 12 is a surfactant produced by Akzo Nobel, USA, Chicago, Ill.

Figure 2:
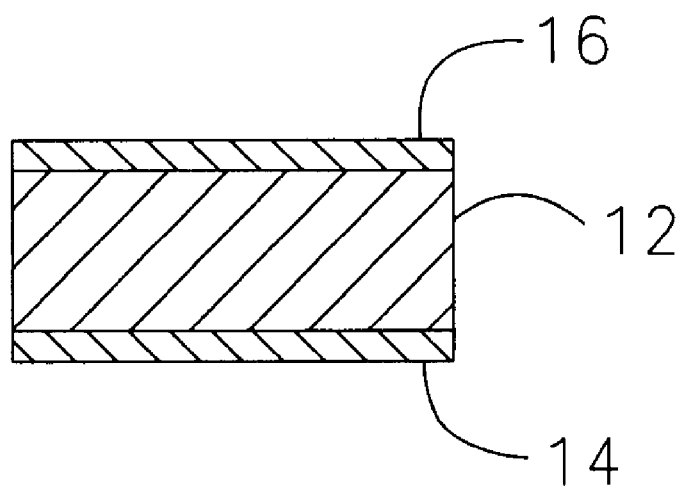
FIG. 2 is a partial cross-section of a coated lamination of the present invention.
Figure 3:
FIG. 3 is a partial cross section of a stack of laminations of the present invention, stacked into a rotor stack.

A stack of laminations may be prepared using these coatings in a method according to another aspect of our invention. Such a stack may comprise a rotor or a stator, such as a rotor or stator useful in a motor or generator. FIG. 1 is a depiction of a stator lamination of the type which may be coated according to the present invention. Part 10 is such a lamination. FIG. 2 is a partial cross section of a lamination coated according to the present invention. Lamination 10 includes the steel lamination 12 and is coated on the bottom and top sides with coating 14 and 16. These laminations 12 may be stacked into a stack 18, such as depicted in FIG. 3. The laminations may be joined together as by welding, adhering, or impaling onto a rotor shaft.

According to our invention, the method includes the steps of preparing the coating, coating the laminations, drying the laminations, and stacking the laminations together. In one aspect of our invention, the method includes the steps of preparing a coating of magnesium methylate and applying it to a plurality of laminations. The laminations are then dried at a temperature sufficient to drive off the methyl alcohol solvent. A temperature of 200 to 450° F. is sufficient for this purpose. The laminations are then stacked together to form a rotor or stator. The laminations are desirably made of a high-performance material in order to achieve the lowest core loss or eddy current loss possible in motors or generators made according to this invention. Accordingly, laminations are preferably made from alloys of cobalt and iron, such as the Hiperco series of electrical steels from Carpenter Technology Corp. of Reading, Pa., or the Vacodur steels from Vacuumschmelze GmbH, Hanau, Germany.

Additional embodiments of our invention will include a method of using these steels in combination with the coating of the present invention, in order to make motors and generators which have low eddy current losses and low core losses. Thus, in one embodiment of our invention, a solution of zero to ten percent by weight magnesium methylate in methyl alcohol is prepared, and applied to laminations made of Hiperco 50. The coating is applied to the laminations by dipping, spraying, brushing, roller coating or by automatic coating machines. The coated laminations are dried at a temperature from 200 to 400° F. The laminations are then stacked together to form a rotor or stator, and joined by applying adhesive, or by welding together, or by pressing together, as on a shaft. In other embodiments of our invention, the coatings described are prepared and applied to laminations. In one embodiment, a coating is prepared from about 4 to 6% magnesium methylate by weight, about 2 to 4% silica by weight, and about 5% to 7% talc by weight, with zero to 1% by weight wetting agent, and the remainder methyl alcohol. This coating is applied to laminations, especially laminations made from Hiperco 50 steel. The coating is applied to the laminations by dipping, spraying, brushing, roller coating or by automatic coating machines. The laminations are then dried, at a temperature sufficient to drive off the solvent, preferably at a temperature from 200 to 400° F.

In another embodiment of our invention, a coating is prepared with 6% talc, 5% magnesium methylate, 3% silica, and 0.4% Victawet 12 surfactant, in a solution of methyl alcohol. The coating is applied to steel laminations, especially laminations made from Hiperco 50. The laminations are allowed to air dry for a brief period, such that when oven drying commences, the coating is not disturbed by the removal of the solvent. The laminations are then dried at a temperature of 200 to 400° F. The laminations are then removed from the oven, stacked, and formed into rotors or stators as desired.

Alternatively, instead of laminations, a coil of steel may be coated, and dried as described. Thus, in another embodiment of this invention, a solution of the desired coating is prepared, and placed into a machine designed to coat coils of steel. The steel is then run through the bath of solution or coating. Desirably, the coated steel coil is then dried and re-rolled. The steel may then be processed, such as by running through a punch press, in which laminations are stamped out for subsequent assembly into rotors and stators. In one embodiment of our invention, a solution is prepared of magnesium methylate in methyl alcohol, and is placed into a bath or tank of a coil-coating machine. A coil of Hiperco 50 steel is placed onto the coil-coating machine. The coil is coated with the solution and is then dried, at a temperature of 200 to 400° F. The coil is re-reeled and is then or subsequently punched into laminations useful for rotors or stators. In another embodiment of our invention, a coating is prepared from about 4 to 6% magnesium methylate by weight, about 2 to 4% silica by weight, and about 5% to 7% talc by weight, with zero to 1% by weight wetting agent, and the remainder methyl alcohol, and is placed into a bath or tank of a coil-coating machine. A coil of Hiperco 50 steel is placed onto the coil-coating machine. The coil is coated with the solution and is then dried, at a temperature of 200 to 400°

F. The coil is re-reeled and is then or subsequently punched into laminations useful for rotors or stators. In another embodiment of our invention, a coating is prepared from about 5% magnesium methylate by weight, about 3% silica by weight, and about 6% talc by weight, with 0.4% by weight wetting agent, and the remainder methyl alcohol, and is placed into a bath or tank of a coil-coating machine. A coil of Hiperco 50 steel is placed onto the coil-coating machine. The coil is coated with the solution and is then dried, at a temperature of 200 to 400° F. The coil is re-reeled and is then or subsequently punched into laminations useful for rotors or stators.

The foregoing description of preferred embodiments of the invention has been presented for purposes of illustration and description, and is not intended to be exhaustive or to limit the invention to the precise form disclosed. The description was selected to best explain the principles of the invention and practical applications of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A coating useful for insulation on steel, comprising:
   magnesium methylate, from four to six percent by weight; silica, from two to four percent by weight; talc, from five to seven percent by weight; a surfactant, from zero to one percent by weight, and the remainder is methyl alcohol.

2. A coating according to claim 1, wherein the surfactant is 0.4 percent by weight.

3. A method of preparing a solution useful for surface insulation on steel, comprising the steps of:
   placing a quantity of methyl alcohol into a container;
   adding from four to ten percent by weight magnesium methylate;
   mixing in silica, in a proportion of two to four percent by weight;
   mixing in talc, in a proportion of five to seven percent by weight;
   mixing in surfactant, in a proportion of zero to one percent by weight; and
   stirring until well mixed.

4. A method according to claim 3, wherein the proportion of magnesium methylate is five percent by weight, the proportion of silica is three percent by weight, the proportion of talc Is six percent by weight and the proportion of surfactant is 0.4 percent by weight.

* * * * *